A. SUNDH.
INDUCTIVE CONTROLLING APPARATUS.
APPLICATION FILED MAR. 1, 1910.
1,052,528.
Patented Feb. 11, 1913.
2 SHEETS—SHEET 1.
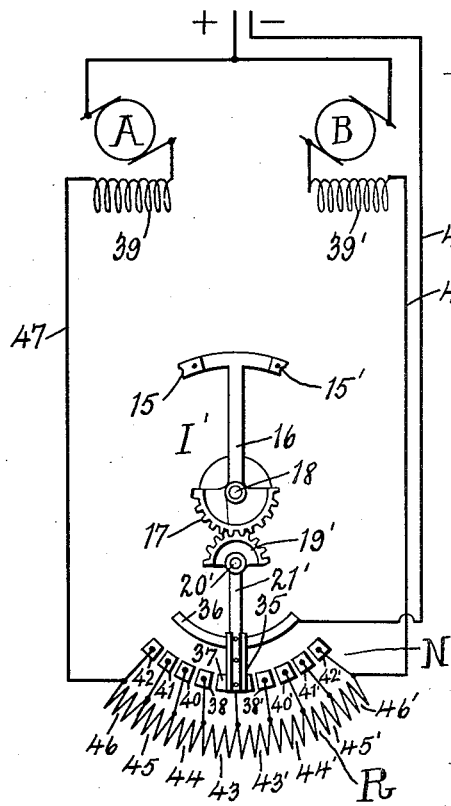
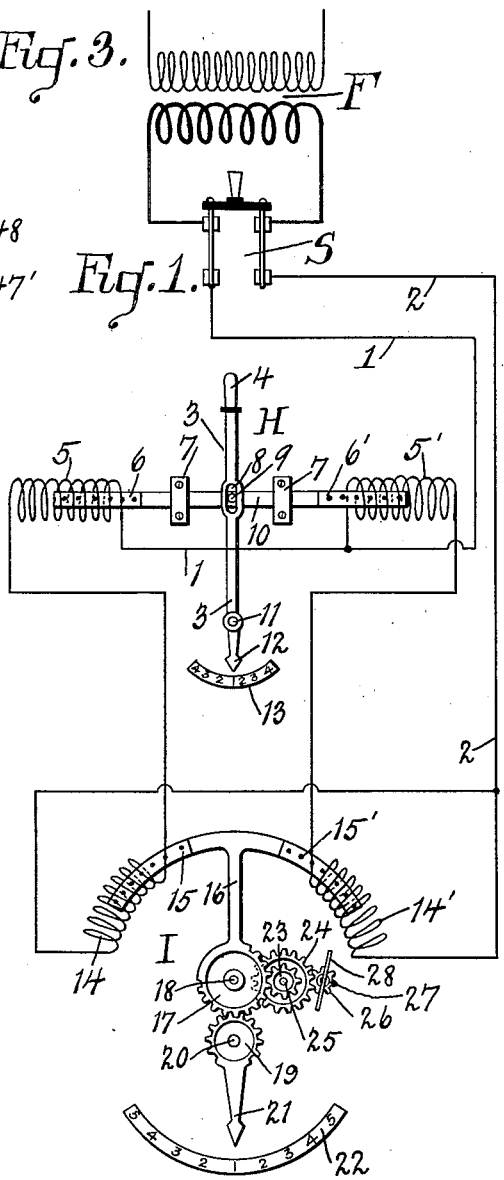
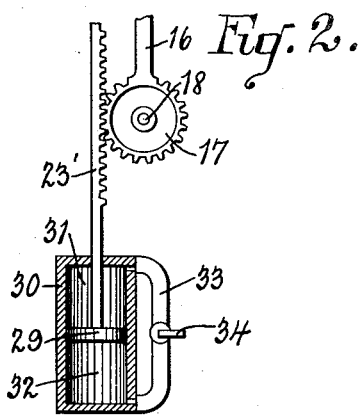
Witnesses:
Inventor:
August Sundh
By
Attorney

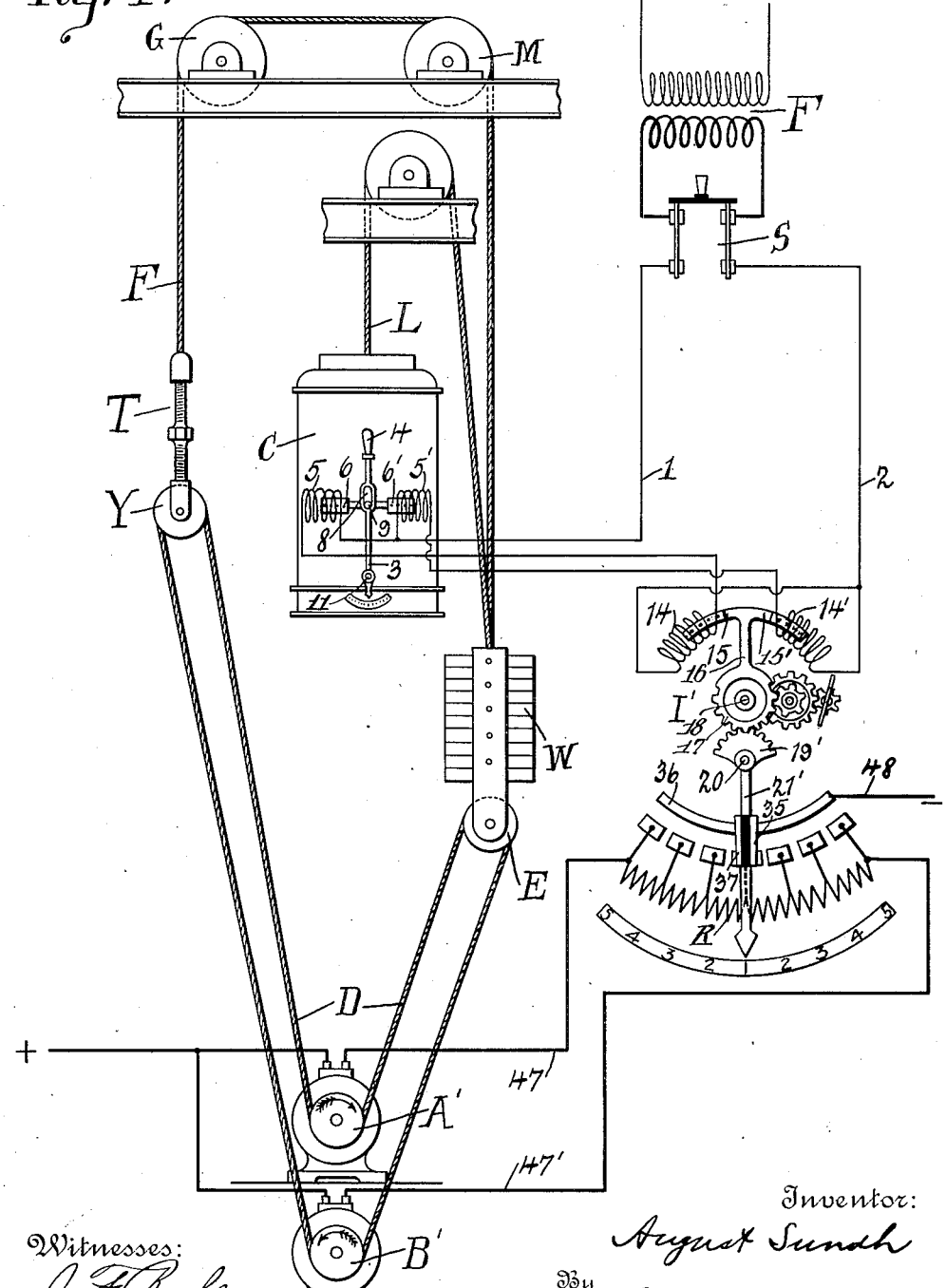

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

INDUCTIVE CONTROLLING APPARATUS.

1,052,528.  Specification of Letters Patent.  Patented Feb. 11, 1913.

Application filed March 1, 1910. Serial No. 546,607.

*To all whom it may concern:*

Be it known that I, AUGUST SUNDH, a citizen of the United States, residing at Yonkers, in the county of Westchester and State of New York, have invented a new and useful Improvement in Inductive Controlling Apparatus, of which the following is a specification.

My invention relates to an inductive controlling apparatus and one of its objects is the provision of means dependent upon inductance to control any desired apparatus.

Other objects of the invention will appear more fully hereinafter, the novel combinations of elements being pointed out in the appended claims.

With my apparatus the inductance in an alternating current circuit or circuits may be controlled or varied by either manual or automatic means located at one place in the circuit or circuits, and the variation in the inductance used to control or operate the various mechanical or electrical devices located at distant points in the circuits. As an example of a practical application of my invention, I have shown a manually operated inductive master switch or controller used to control an indicator located at a distance from the master switch. I have also shown a switch of this kind used to control an electric motor system.

Obviously the invention may be used in the control of numerous other electro-mechanical devices located at a distance from the master switch, as the inductance of a circuit, and consequently the impedance, may be taken advantage of to effect mechanical motion to operate any mechanical or electro-mechanical device which is located near or at a distance from the master switch.

In the accompanying drawings Figure 1 shows an inductively controlled indicator; Fig. 2 is a fragmentary view showing a modification of certain parts of Fig. 1; Fig. 3 shows my invention applied to a motor control system; and Fig. 4 shows the application of my invention to an elevator system.

Similar reference characters denote similar parts throughout the different views.

Referring to Fig. 1, F designates a transformer connected to conductors leading from a source of alternating current supply, and also connected to the main line switch S which controls the continuity of the motor circuit extending from the secondary winding of the transformer F. H is a manually operated controlling switch comprising a switch lever 3 pivoted at 11 and having a slot 8 into which extends a pin 9 fastened to the horizontal bar 10. To the ends of this bar are connected laminated cores 6 and 6' which extend substantially half way into the windings or solenoids 5 and 5', respectively. The lower end of the lever 3 is provided with a pointer 12, the movement of which in either direction is indicated on a scale 13. I is an indicator or electro-responsive device comprising a gear 17 pivoted at 18 and having an upwardly extending T-shaped arm 16 to which are attached laminated cores 15 and 15'. Each of the latter extends part way, preferably substantially half way, into the solenoids 14 and 14', respectively. The gear 19 pivoted at 20 meshes with the gear 17 and carries a pointer 21 which is arranged to move over a scale 22. The gear 17 is in mesh also with the gear 23 on the shaft 25 which is connected to a larger gear 24, and the latter is in mesh with a smaller gear 26 carrying a vane 28. This train of gears acts as a retarding device to check the movement of the gear 17, since a comparatively slow movement of the gear 17 will cause the vane 28 to rotate rapidly and thus generate considerable friction against the air.

The conductor 1 is common to one terminal of each of the solenoids or coils 5 and 5' and is connected to one side of the main line switch S. The other side of this switch is connected by the conductor 2 to one terminal of each of the solenoids 14 and 14'. The solenoid 14 is connected in series with the solenoid 5 and the solenoid 14' is connected in series with the solenoid 5'. By virtue of these connections two parallel circuits are established, one including the solenoids 5 and 14 and the other the solenoids 5' and 14'. When the parts assume the positions shown in Fig. 1 the sums of the ohmic resistance and impedance in the respective parallel circuits are substantially the same, and, therefore the current flow in each parallel branch will be substantially the same and both sides will be in electrical balance.

In order to explain the operation of the controlling apparatus let it be assumed that the switch lever 3 is moved a short distance to the right by means of the insulated handle 4 until the pointer 12 points to the figure 2 on the scale 12. As the switch lever is moved the bar 10 is also moved by reason of the pin-and-slot connection between the two. Thus an additional portion of the core 6' is projected into the solenoid 5' while a corresponding portion of the core 6 is withdrawn from the solenoid 5. The current in the parallel circuit is no longer the same, since the impedance of the circuits containing the solenoids 5 and 14 is lower while the impedance of the parallel branch containing the solenoids 5' and 14' is increased, and for this reason the current now flowing in the latter is less than the current flowing from the solenoids 5 and 14. This is for the reason that the less the reluctance for the lines of force of the solenoid 5, the greater will be the inductance and consequently the greater the impedance. Therefore when the core 6' is projected farther into the solenoid 5' the magnetic reluctance is decreased, the inductance is increased and consequently the impedance to the flow of alternating current is increased. In a similar manner, when the core 6 is withdrawn from the solenoid 5 the reluctance to the lines of force is increased, the inductance is decreased and the impedance is also decreased so that more current can flow through the solenoid 5.

It is readily seen that the magnetic pull of the solenoid 14 will therefore be greater at this time than the pull of the solenoid 14' by reason of its greater strength, and therefore the pull of the solenoid 14 will overcome that of the solenoid 14' and the core 15 will be drawn farther into the solenoid 14, thereby rotating the gear 17 and causing the pointer 21 to move along the scale 22 in a left-hand direction until it comes to the figure 2. As the core 15 moves farther into the solenoid 14 the impedance of the circuit containing this solenoid is thereby increased, while the impedance of the circuit including the solenoid is correspondingly decreased until finally an electrical balance between the parallel branches is again established and the gear 17 and its connected parts will therefore come gradually to rest. A further movement of the switch handle 4 to the right will at once upset or disturb this electrical balance by altering the relative impedance of the parallel branches and the pointer 21 will again be moved along the scale 22 in a left hand direction until this balance is again established, when the pointer will come to rest substantially at a point on the scale 22 corresponding to that of the pointer 12 on the scale 13.

If the switch lever 3 is brought back to its initial or vertical position, the impedance of the solenoids 5 and 5' is again the same but the current in each is not the same, since at this time the solenoid 14 contains a greater amount of core length than does the solenoid 14'. The impedance of the circuit containing the solenoids 5' and 14' is less than that of the branch parallel thereto, and therefore the flow of the current through the solenoid 14' is increased while the flow through the solenoid 14 is correspondingly decreased. The result is that the arm 16 with its connected parts will be moved back to a central or vertical position, which operation again places the system in electrical and mechanical balance.

Should the switch lever 3 be moved to the left the responsive device I would at once operate to move its pointer 21 to the right a corresponding amount, or until the balance which is disturbed every time the switch 4 is operated has automatically been restored by the responsive device I. Thus it is seen that for any movement of the switch H a corresponding movement of the responsive device I takes place.

Instead of using a train of gears and connected vanes to produce a damping or retarded movement of the arm 16 and the cores 15, 15', I sometimes use the mechanism illustrated in Fig. 2. Here a rack 23' meshes with the gear 17 and carries at its lower end a piston 29 arranged to move in a closed cylinder 30 provided at either end with ports which are in communication with each other through a by-pass 33 having an adjustable valve 34, by means of which the passage of fluid from one port to the other may be regulated. This cylinder may contain air, oil or any other suitable fluid, the object being to check the free movement of the piston 29 as the latter displaces the fluid contained in the chambers 31 and 32, causing it to flow through the by-pass pipe 33 and valve 34. By adjusting the valve 34 the retardation of the piston 29 may be increased or decreased to any desired extent. These retarding devices are shown merely for the purpose of illustration, as any other suitable retarding device may be used if desired.

The apparatus shown in Fig. 3 comprises two direct current electric motors with their armatures A and B and series field windings 39 and 39', respectively. N is a rheostat controlled by the responsive device I' comprising a sectional gear 19' pivoted at 20' and in mesh with the gear 17. To the sectional gear 19' is connected a contact-carrying arm 21', to the outer end of which is connected the resistance-varying member 35, but the latter is insulated from the arm 21' as shown. This resistance-varying member 35 is in electrical and sliding contact with the arc-shaped conducting strip 36 and a series of stationary contacts 37, 38, 40, 41, 42 and 38', 40', 41', 42'. A resistance R is connected at its opposite ends to the contacts 42 and 42', and the remaining contacts of the series are connected at intervals to this resistance. The circuit for the motors extends from the source of current supply through the positive main, and thence through both armatures A and B in parallel and in the same direction and through the series fields 39 and 39' in opposite directions, and then through the conductors 47 and 47' to the opposite ends of the resistance R. An intermediate point of this resistance, preferably the middle point, is connected by the contact 37, resistance-varying member 35 and contact strip 36 to the conductor 48 which leads to the negative main, the latter being connected to the source of current supply. Thus the motors are connected in parallel with a portion of the resistance R in circuit with each. The motor fields, however, receive current in opposite directions so that the motor armatures will rotate in opposite directions. If the arm 16 which carries the cores 15 and 15', as illustrated in Fig. 1, be moved to the right, the arm 21' is also moved to the right until the resistance-varying member 35 electrically connects the contact 38' and the strip 36, the sections 43' of the resistance R will be included in the circuit of the motor armature A and at the same time removed from the circuit of the armature B. This will cause the motor armature A to decrease in the speed of rotation and the armature B will increase its speed of rotation. Upon further movement of the arm 21' in the same direction a still greater relative difference in the motor speeds is produced. If the arm 21' is moved back to center or to its vertical position the motors will again run at substantially the same rates of speed, and if moved over to the left the motor armature A will run faster while the armature B will run more slowly.

The device just described is particularly adapted to the elevator apparatus shown in Fig. 4 in which C designates an elevator car suspended by a cable or cables L which passes over a sheave M and is connected to a counterbalance weight W. Another cable or cables F is also connected to this counter-balance weight and passes over the sheaves M and G and is connected to a tension device T. A' and B' are driving pulleys connected to the motor armatures A and B. E and Y are traveling pulleys, the former being attached to the counterweight W and the latter to the tension device T. An endless cable or cables D passes around both of the driving pulleys A' and B' and also around both of the traveling pulleys E and Y. The former driving pulleys and the motors which are connected thereto and the endless cable are so arranged that each of them continues to run in one direction without stopping or reversing its motion, while the elevator car will either remain stationary or will be moved upwardly or downwardly, as desired. When the circumferential speed of the two driving pulleys is the same and they rotate in opposite directions, the car will remain stationary. When it is desired to move the car upwardly or downwardly the relative rate of circumferential speed of the driving pulleys is varied so that one driving pulley will run slower or faster than the other, whereupon the elevator car will be moved upwardly or downwardly according to which one of the driving pulleys is given the greater circumferential velocity.

While I have shown in Fig. 3 a direct current motor-controlling apparatus, my invention is also adapted to alternating current motors of any desired type, and although I have shown a method of controlling motors by varying the series resistance, the relative strengths of motor shunt fields may be varied instead, or, both the field strength and armature potential may be varied so as to produce a change in speed.

Where my inductive controlling apparatus is used in the operation of electric elevators it is desirable to locate the master switch H in the car, so that the entire operation of starting, stopping and reversing the motion of the elevator car may be controlled from the latter.

From the foregoing it is evident that my invention furnishes an efficient and simple means for effecting the control and operation of various kinds of apparatus at a distance without employing any switches which must be opened and closed during normal operation of starting and stopping. This is particularly important in alternating current apparatus where it is difficult to secure firm electrical connections at the switch contacts, and to prevent noise or chattering due to alternations of magnetism in electro-magnet actuating devices for the switches.

While I have described the operation of my invention in connection with an indicating responsive device and a well known type of elevator apparatus, I do not wish to be limited to such application. Furthermore, it is obvious that various changes in the details and arrangement of parts may be made by those skilled in the art without departing from the spirit and scope of my invention, and I desire therefore not to be limited to the precise construction herein disclosed.

What I claim as new and desire to have protected by Letters Patent of the United States is:—

1. The combination with parallel circuits, and a source of current supply, of means for varying the relative inductance in the circuits, and an electro-responsive device operated by such variation.

2. The combination with electric circuits and a source of alternating current supply, of inductance coils in said circuits, manually controlled means for varying the inductances in the circuits, and a magnetically balanced electro-responsive device in one of the circuits.

3. The combination with electric circuits and a source of alternating current supply, of inductance coils in said circuits, manually controlled means for varying the inductances in the circuits, and a magnetically balanced electro-responsive device operated by such variation.

4. The combination with electric circuits and a source of alternating current supply, of inductance coils in the circuits, means for varying the relative inductance in the coils, and an electro-responsive device operated by such variation.

5. The combination with parallel electric circuits and a source of alternating current supply, of inductive resistances in the circuits, means for manually varying the resistances, and an electro-responsive device in the circuits.

6. The combination with an electric circuit and a source of alternating current supply, of inductance coils in the circuit, a magnetic core movable in said coils to vary the relative impedance of the coils, a manually-operable lever connected to the core, and an electro-responsive device in the circuit and controlled by such variations.

7. The combination with an electric circuit and a source of alternating current supply, of inductive resistances in the circuit, means for varying one of said resistances to vary the inductance in the other resistance, and an electro-responsive device operated by the variation of the inductance in the said other resistance.

8. The combination with an electric circuit and a source of alternating current supply, of inductance coils in the circuit, magnetic cores for the coils, manually-operable means for varying the relative position of one of the coils and its core to vary the inductance and current strength in the circuit, means for holding the other magnetic core yieldingly balanced against the magnetic pull of its coil, and a movable element operatively connected to the last named core and movable into positions determined by the varying positions assumed by said core as the current strength is varied.

9. The combination with a source of alternating current supply and a divided circuit, of an inductive resistance in each branch of the circuit, means for increasing the inductance in one circuit and decreasing the inductance in the other circuit, and an electro-responsive device controlled by the variation of inductance in the circuit.

10. The combination with a source of alternating current supply and a divided circuit, of means for simultaneously increasing and decreasing the inductance in the respective branches of the circuit, and an electro-responsive device controlled by the variation of inductance in the circuit.

11. The combination with a source of current supply and a divided circuit, of means for simultaneously increasing and decreasing the resistance in the respective branches of the circuit, and an electro-responsive device controlled by the variation of the resistance in the circuit.

12. The combination with a source of alternating current supply and a divided circuit, of two inductive resistances in each branch of the circuit, means for simultaneously increasing the impedance in a coil of one branch and decreasing it in a coil of the other branch, to vary the current in the branches, and an electro-responsive device operated by the variations of inductance in the other resistances as the current varies.

13. The combination with a source of alternating current supply and a divided circuit, of an inductance coil in each circuit, a movable member held in a balanced position by the magnetic pulls of said coils, and means for varying the current strength in the circuits to disturb said balance and cause said member to move.

14. The combination with a source of alternating current supply and a divided circuit, of an inductance coil in each circuit, a movable member located between the coils, magnetic cores for the coils carried by said member and extending into the coils, said member being held in a position of equilibrium between the magnetic pulls of the coils and the cores, and means for varying the relative current strength in the circuits.

15. The combination with a source of alternating current supply and a divided circuit, of inductance coils in each branch of the circuit, a movable member between coils respectively in the branches of said circuit, magnetic cores connected to said member and extending into the coils, a second movable member located between other coils respectively in the branches of said circuit, magnetic cores connected to said member and extending into said last-named coils, said second member being held in a position of equilibrium by the magnetic pulls of the coils on the cores, and means for moving said first member to vary the relative current strength in the circuits and disturb the equilibrium of the second member.

16. The combination with a source of alternating current supply and an electric circuit, of a movable member, means operated by said member to vary the inductance in the circuit, a second member, and means operated only by the variation of the inductance to cause a movement of the second member proportional to the movement of the first member.

17. The combination with an electric circuit and a source of alternating current supply, of a movable member, an inductance coil in the circuit, means for varying the inductance of the coil upon the movement of said member, a second inductance coil in the circuit, a second member movable independently of the first, and means operated by the variation of inductance in the second coil for causing a movement of the second member proportional to the movement of the first member.

18. The combination with a divided circuit and a source of alternating current supply, of an inductance coil in each circuit, magnetic cores for the coils, normally-operable means for simultaneously moving the cores so that the inductance of one coil is increased and that of the other decreased, a second coil in each circuit, magnetic cores therefor, a movable member connected to said last-named cores, said cores being movable upon the variation of inductance in the circuits to give said member a movement proportional to the movement of the operating means.

19. The combination with a source of alternating current supply and a divided circuit, of an inductance coil in each circuit, a movable member located between the coils, magnetic cores carried by said member and normally extending partially into the coils, means for moving said member in either direction to vary the inductance on the circuits, a second coil in each circuit, a movable member located between said coils, magnetic cores carried by the second movable member and normally extending partially into the coils, said member being balanced by the magnetic pulls of the coils and movable when the balance is disturbed by the movement of the first member into a position corresponding to the changed position of the first member.

20. The combination with a source of alternating current supply and an electric circuit having parallel branches, of means for varying the relative inductance in said branches, an electro-responsive device operable by the variation of inductance, and means for retarding or dampening the movement of said device.

21. The combination with a source of alternating current supply and an electric circuit having parallel branches, of means for varying the inductance in said branches of the circuit, an electro-responsive device movable upon the variation of the inductance, and retarding mechanism connected to said electro-responsive device.

22. The combination with electric circuits and a source of alternating current supply, of inductance coils in said circuits, means for varying the inductances in the circuits, an electro-responsive device operated by the variation in inductance, and a rheostat operatively connected to said electro-responsive device.

23. The combination with a manually-operable member, of inductive electric circuits, means operated by the said member to vary the inductances in the circuits, an electro-responsive device operable upon the variation of the inductance, and a rheostat having its movable member operatively connected to the electro-responsive device, and movable upon the operation of the manually-operable member.

24. In an elevator system, the combination with a load-carrying device, an electric motor and operative connections between the motor and load-carrying device, of a source of current supply, parallel electric circuits, manually-operable means for varying the relative inductance in said circuits, an electro-responsive device operated by said variation, and means operated by said electro-responsive device for controlling the motor.

25. The combination with an electric circuit and a source of alternating current supply, of means for varying the inductance in the circuit, a manually-operable member connected to said means, an indicator associated with said member, an electro-responsive device operable upon the variation of inductance in the circuit, and an indicator associated therewith.

26. The combination with an electric circuit and a source of alternating current supply, of inductance coils in the circuit, a magnet core movable in said coils to vary the relative impedance of the coils, a manually operable lever connected to the core, and an electro-responsive device in the circuit and controlled by such variations.

In testimony whereof, I have signed my name to this specification in the presence of two subscribing witnesses.

AUGUST SUNDH.

Witnesses:
JOHN F. RULE,
JAMES G. BETHELL.